US011164052B2

(12) United States Patent
Hurry et al.

(10) Patent No.: US 11,164,052 B2
(45) Date of Patent: Nov. 2, 2021

(54) IMAGE PROCESSING OF WEBPAGES

(71) Applicant: Merck Sharp & Dohme Corp., Rahway, NJ (US)

(72) Inventors: David B. Hurry, Mount Airy, MD (US); David J. Tabacco, Phillipsburg, NJ (US)

(73) Assignee: Merck Sharp & Dohme Corp., Rahway, NJ (US)

( * ) Notice: Subject to any disclaimer, the term of this patent is extended or adjusted under 35 U.S.C. 154(b) by 0 days.

(21) Appl. No.: 16/885,176

(22) Filed: May 27, 2020

(65) Prior Publication Data

US 2020/0285918 A1    Sep. 10, 2020

Related U.S. Application Data

(63) Continuation of application No. 16/172,646, filed on Oct. 26, 2018, now Pat. No. 10,713,545.

(51) Int. Cl.
| | |
|---|---|
| *G06K 9/34* | (2006.01) |
| *G06K 9/78* | (2006.01) |
| *G06K 9/62* | (2006.01) |
| *G06F 16/95* | (2019.01) |

(52) U.S. Cl.
CPC .............. *G06K 9/78* (2013.01); *G06F 16/95* (2019.01); *G06K 9/348* (2013.01); *G06K 9/6201* (2013.01); *G06K 2209/01* (2013.01)

(58) Field of Classification Search
CPC ........ G06K 9/78; G06K 9/348; G06K 9/6201; G06F 16/95
See application file for complete search history.

(56) References Cited

U.S. PATENT DOCUMENTS

| | | | | |
|---|---|---|---|---|
| 9,177,225 B1* | 11/2015 | Cordova-Diba | ... | G06K 9/00671 |
| 10,341,507 B1* | 7/2019 | Kamata | ............. | H04N 1/00076 |
| 10,467,504 B1* | 11/2019 | Hamedi | ............... | G06K 9/6215 |
| 2006/0253581 A1* | 11/2006 | Dixon | ..................... | G06F 21/44 |
| | | | | 709/225 |
| 2015/0170333 A1* | 6/2015 | Jing | ...................... | G06F 16/532 |
| | | | | 345/660 |
| 2017/0098124 A1* | 4/2017 | Jonsson | .................. | G06K 9/628 |
| 2020/0285918 A1* | 9/2020 | Hurry | ..................... | G06K 9/78 |

* cited by examiner

*Primary Examiner* — Md K Talukder
(74) *Attorney, Agent, or Firm* — Fenwick & West LLP

(57) ABSTRACT

A web detection system processes webpage information and performs automated feature extraction of webpages including machine processable information. In an embodiment, the web detection system determines a subset of webpages having a target characteristic by processing markup language. For a webpage of the subset, the web detection system determines that a first image overlaps at least a portion of a second image in the webpage. The web detection system generates an image of the webpage such that the portion of the second image is obscured by the first image. The web detection system determines a graphical feature of the webpage by processing the image, e.g., using optical character recognition. Responsive to determining that the graphical feature corresponds to graphical features of images of a different set of webpages associated with a target entity, the web detection system determines that the webpage is also associated with the target entity.

20 Claims, 6 Drawing Sheets

IMAGE PROCESSING OF WEBPAGES

CROSS REFERENCE TO RELATED APPLICATION

This application is a continuation of co-pending U.S. application Ser. No. 16/172,646, filed Oct. 26, 2018, which is hereby incorporated by reference in its entirety.

TECHNICAL FIELD

The disclosure is related to the field of image processing and processing of webpages.

BACKGROUND

Optical character recognition (OCR) technology can convert images of text into actual text such as machine-encoded text. Systems may use optical character recognition to identify content of webpages. For example, an image of a home page or landing page of a website may be converted to determine an entity providing content for presentation via the website as well as contact information of the entity. Due to the sheer volume of existing websites and multiple webpages that may be included as part of a given website, it is computationally expensive to process large samples of websites.

Furthermore, markup language of a webpage may include information that is different than other information presented graphically on a client device to a viewer. As an example, the markup language includes multiple phone numbers, but a rendered version of the webpage shows only one of the phone numbers. In addition, a malicious entity may attempt to deceive automated processing systems or optical character recognition systems by obfuscating certain information presented on webpages. The technical challenges of optical character recognition may be barriers to efficient processing of webpages and detection of potential obfuscation or fabrication of information by malicious entities.

BRIEF DESCRIPTION OF DRAWINGS

The disclosed embodiments have advantages and features that will be more readily apparent from the detailed description, the appended claims, and the accompanying figures (or drawings). A brief introduction of the figures is below.

DETAILED DESCRIPTION

The Figures (FIGS.) and the following description relate to preferred embodiments by way of illustration only. It should be noted that from the following discussion, alternative embodiments of the structures and methods disclosed herein will be readily recognized as viable alternatives that may be employed without departing from the principles of what is claimed.

Reference will now be made in detail to several embodiments, examples of which are illustrated in the accompanying figures. It is noted that wherever practicable similar or like reference numbers may be used in the figures and may indicate similar or like functionality. The figures depict embodiments of the disclosed system (or method) for purposes of illustration only. One skilled in the art will readily recognize from the following description that alternative embodiments of the structures and methods illustrated herein may be employed without departing from the principles described herein.

Configuration Overview

A web detection system processes webpage information and performs image processing. In one embodiment, the web detection system processes markup language of webpages to determine that a subset of the webpages includes a target characteristic, for example, a keyword or specific metadata. The web detection system may perform further processing on webpages included in the subset. As an example use case, the web detection system determines that images overlap each other in a webpage based on markup language of the webpage, e.g., indicating dimensions and coordinates of the images for rendering on a display. The web detection system generates an image taking into account the overlap in images, which represents an actual view of the webpage that is seen by a user. By processing the generated image, the web detection system determines a graphical feature of the webpage. The graphical feature may indicate a deviation between strings represented by the overlapped images.

Responsive to determining that the graphical feature corresponds to graphical features of images of other webpages associated with a target entity, the web detection system determines that the webpage is also associated with the target entity. For instance, the webpages associated with the target entity have similar characteristics of overlapped images, which may indicate content such as contact information or content provided by the target entity. In some embodiments, the graphical features are indicative of activity by a malicious party. Specifically, the malicious party may provide fabricate or fraudulent content for presentation in webpages to deceive users. For instance, the malicious entity is attempting to imitate identity of—or association with—another entity. Accordingly, the web detection system can use the graphical features to detect suspected malicious parties and facilitate intervention to remediate fabricated or fraudulent content.

System Overview

Figure 1:
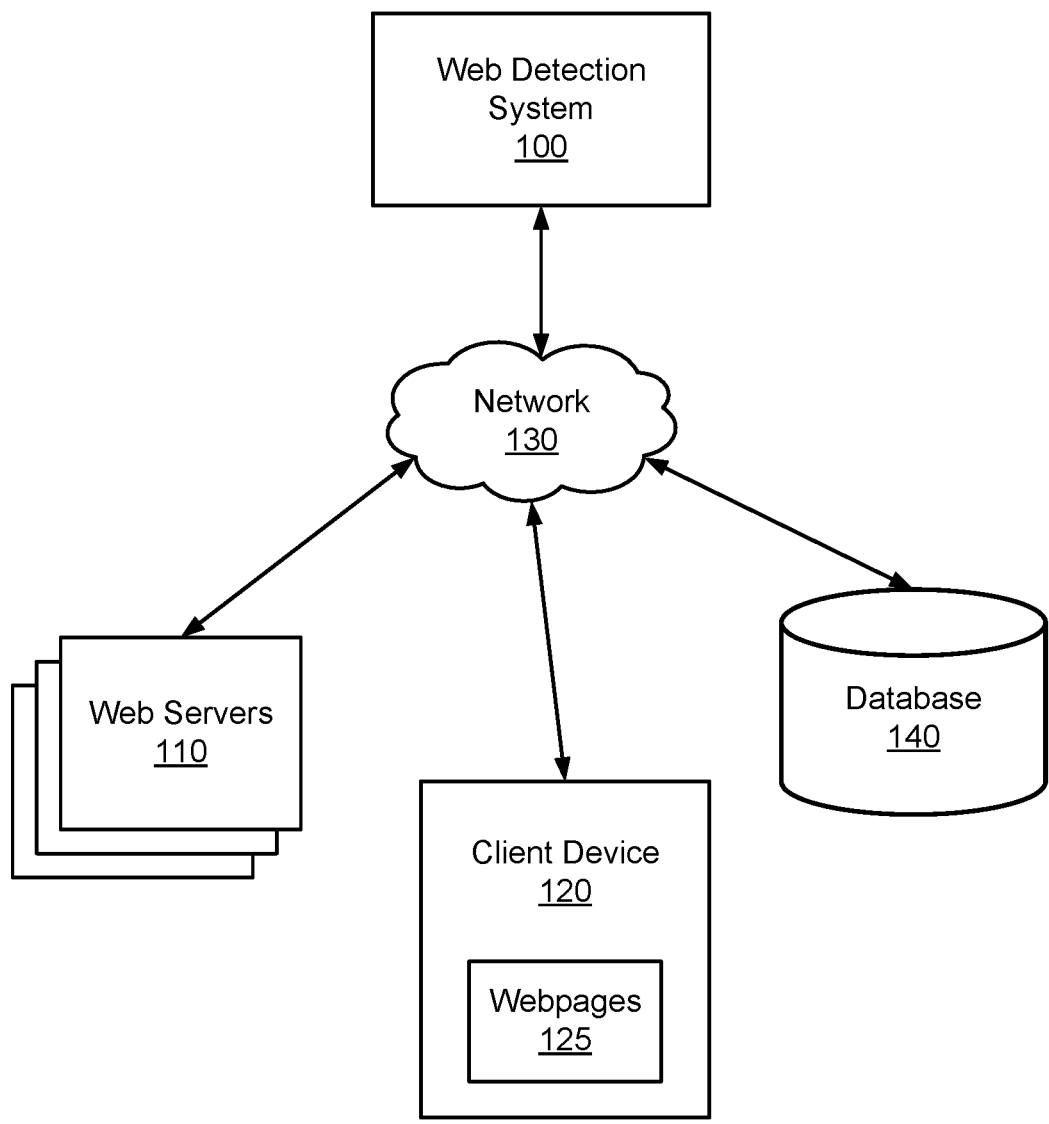
FIG. 1 is a diagram of a system environment for a web detection system in accordance with one embodiment.

FIG. 1 illustrates an example system environment for a web detection system 100 in accordance with one embodiment. The system environment shown in FIG. 1 includes the web detection system 100, one or more web servers 110, a client device 120, and database 140, which are connected to each other via a network 130. In other embodiments, different or additional entities can be included in the system environment. For example, though only one client device 120 and database 140 is shown in FIG. 1, the system environment may include additional client devices 120 and/or databases 140. The functions performed by the various entities of FIG. 1 may vary in different embodiments.

A client device 120 comprises one or more computing devices capable of processing data as well as transmitting and receiving data over a network 130. For example, a client device 120 may be a desktop computer, a laptop computer, a mobile phone, a tablet computing device, an Internet of Things (IoT) device, or any other device having computing and data communication capabilities. The client device 120 includes a processor for manipulating and processing data, a network connection for communicating with other devices, and a storage medium for storing data, program code, and/or program instructions associated with various applications. It is noted that a storage medium may include volatile memory (e.g., random access memory) and/or non-volatile storage memory such as hard disks, flash memory, and external memory storage devices.

The client device 120 receives information from one or more of the web servers 110 and/or a database 140 to present webpages 125 to a user. A given webpage 125 or web server 110 may be associated with a given entity. In some embodiments, the entity provides content such as text, images, video, audio, or other media for presentation to users. The entity may also provide goods, services, or other information. Entities may include any number of legitimate entities or malicious entities. Webpages 125 of legitimate entities represent real identities of the legitimate entities. In contrast, webpages 125 of malicious entities may include fabricated or fraudulent content intended to deceive users. For example, a malicious entity may seek to assume the identity of a legitimate entity or show an apparent association with the legitimate entity. The web detection system 100 may process webpages 125 or other information from a web server 110 or database 140 to determine entities (e.g., legitimate or malicious) associated with certain ones of the webpages 125.

The network 130 may comprise any combination of local area and wide area networks employing wired or wireless communication links. In one embodiment, network 130 uses standard communications technologies and protocols. For example, network 130 includes communication links using technologies such as Ethernet, 802.11, worldwide interoperability for microwave access (WiMAX), 3G, 4G, 5G, code division multiple access (CDMA), digital subscriber line (DSL), etc. Examples of networking protocols used for communicating via the network 130 include multiprotocol label switching (MPLS), transmission control/protocol/Internet protocol (TCP/IP), hypertext transport protocol (HTTP), simple mail transfer protocol (SMTP), and file transfer protocol (FTP). Data exchanged over the network 130 may be represented using any format, such as hypertext markup language (HTML) or extensible markup language (XML). In some embodiments, all or some of the communication links of the network 130 may be encrypted.

Example System Architecture

Figure 2:
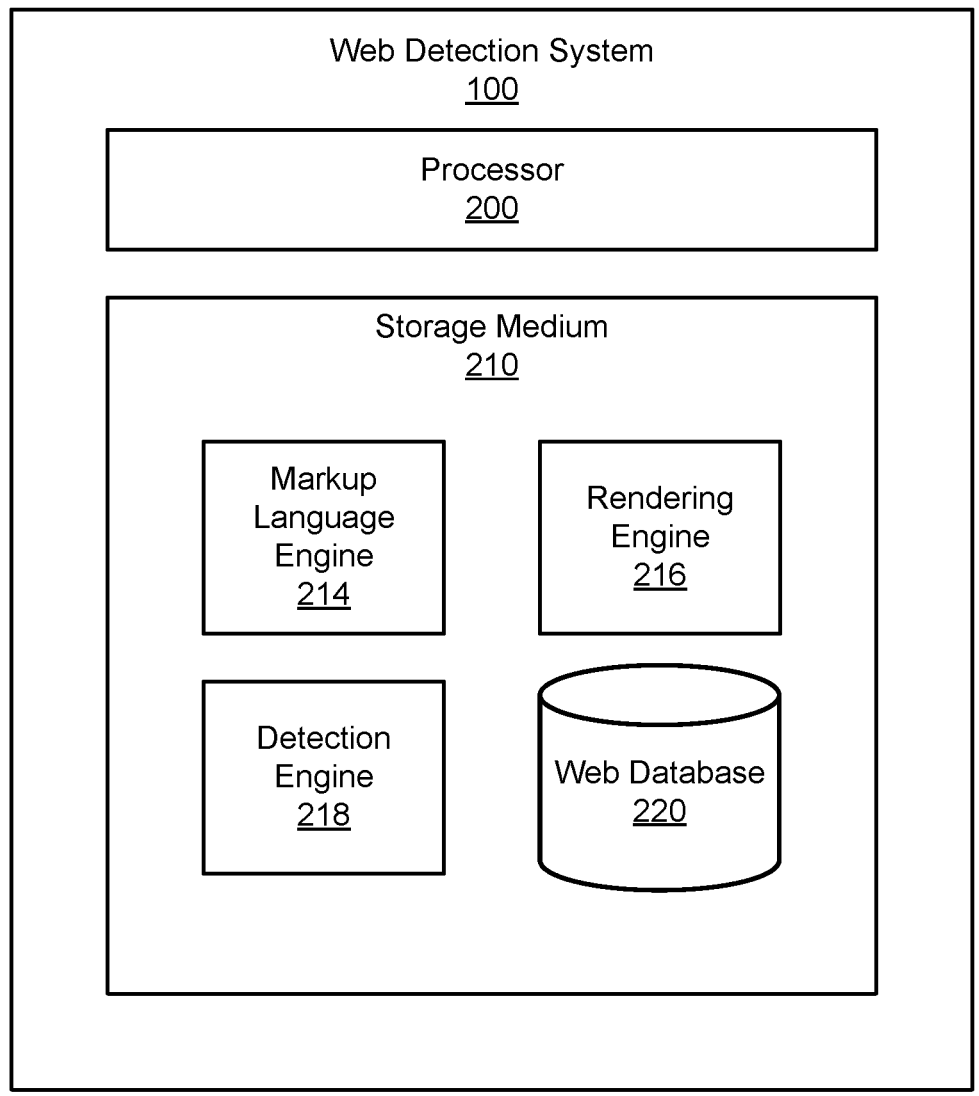
FIG. 2 is block diagram of a web detection system in accordance with one embodiment.

FIG. 2 is block diagram of a web detection system 100 in accordance with one embodiment. The web detection system 100 may include a processor 200 for manipulating and processing data, a network connection for communicating with other devices, and a storage medium 210 for storing data and program instructions associated with various modules. In one example embodiment, the storage medium 210 comprises a non-transitory computer-readable storage medium. Various executable programs are each embodied as computer-executable instructions stored to the non-transitory computer-readable storage medium 210. The instructions when executed by the processor 200 cause the web detection system 100 to perform the functions attributed to the programs described herein. Further detail of an example computer system corresponding to the web detection system 100 is described below with reference to FIG. 6. The storage medium 210 includes a markup language engine 214, rendering engine 216, detection engine 218, and a web database 220. Alternative embodiments may include different or additional modules or omit one or more of the illustrated modules.

The markup language engine 214 processes markup language of web sites or webpages. The markup language engine 214 may determine a set of webpages to process using webpage identifiers, e.g., a uniform resource locator (URL) or Internet Protocol (IP) address. In an embodiment, the markup language engine 214 receives one or more webpage identifiers using an application programming interface (API), which may be associated with an online search engine or social networking system. The markup language engine 214 may perform a textual analysis of markup language including any number of HTML, PHP, cascading style sheets (CSS), or other suitable types of code or programming languages. Using the textual analysis, the markup language engine 214 can determine a target characteristic of a corresponding webpage. For instance, the target characteristic may be a keyword included in the markup language. In other embodiments, the target characteristic may include an image or video file, URL, database, or pattern, geolocation, metadata, among other types of characteristics. A pattern may indicate a particular style or signature of the markup language, which may vary between users who draft or edit markup language or code. As an example, the pattern may be based on formatting attributes of variable names or data structures in code of the markup language.

The rendering engine 216 generates images of webpages, where the images reflect actual views of the webpages displayed on a client device 120 to be seen by a user. In particular, not all information included in markup language of a webpage may be presented in an actual view of the webpage as rendered to the user. In some embodiments, the markup language includes code or metadata, which may or may not be used for generating a render of the webpage, but at least some of the markup language itself is not visible in the rendered webpage. For instance, the markup language encodes graphical attributes including text attributes (e.g., font, size, style, etc.), formatting (e.g., page frames, dimensions, or relative or absolute locations of elements arranged in a graphical user interface), content of webpage sections (e.g., headers, footers, body, tables, images, videos, etc.), or animations and visual effects, among other types of visually perceptible elements or attributes.

The rendering engine 216 may generate an image of a webpage using one or more parameters. As an example use case, responsive to determining a certain type (or operating system) of a client device 120 for displaying a webpage, the rendering engine 216 generates an image of the webpage suitable for the certain type of client device 120. Accordingly, the rendering engine 216 may generate a webpage for display on a smartphone or tablet type of client device 120 having a more compact layout relative to a different layout for a laptop or desktop computer type of client device 120. In a different example, the rendering engine 216 may customize renders of webpages using other parameters such as geographical location, e.g., determined based on Internet Protocol (IP) address or global positioning system (GPS) data. The language (e.g., English, Spanish, Chinese, etc.) or other location-specific content of a webpage may be customized according to a country or other region in which the client device 120 is located when presenting the webpage. The region may be defined by a geo-fence determined by the web detection system 100. For instance, a geo-fence may be associated with a location within an indoor (e.g., building) or outdoor area.

In some embodiments, the rendering engine 216 determines that at least some content from an image of a webpage is not visually perceptible by a user when the webpage is presented by a client device 120 to a user. As an example, the rendering engine 216 determines that a first image obscures a portion of a second image. The rendering engine 216 may detect the obstruction using graphical attributes indicated by markup language such as dimensions and locations of the first and second images. Responsive to determining that the images overlap (e.g., by performing geometric calculations or projections), the rendering engine 216 determines which image is rendered in the foreground or background to determine which image is obscured (while the other image is obstructing). By accounting for the obstruction, the rendering engine 216 may generate images of webpages that represent actual views perceived by a user. That is, the user may not be able to see the obscured portion of the second image and may instead see content in the (e.g., non-transparent) first image overlapping the portion of the second image.

In some embodiments, the rendering engine 216 may paint multiple layers of information of a webpage in locations (e.g., based on relative or absolute coordinates of a graphical user interface) specified in code or markup language for one or more (or all) text elements and image segments sequentially. The rendering process of the rendering engine 216 may obscure at least a portion of previously rendered text or image segments, or other objects such as video of a webpage. Additionally, the rendering engine 216 may render the layers by taking into account attributes such as transparency, color, font, graphical elements, or other types of attributes, in a rendered image of the webpage that represents objects visible to a user. The rendered image is made machine processable through image processing by the rendering engine 216. The web detection system 100 may use an encoded 2-dimensional image (generated by the rendering engine 216) with at least one hidden layer of text or image obscured or altered to perform automated feature extraction.

The detection engine 218 determines graphical features of webpages by processing images of the webpages. In particular, the detection engine 218 determines graphical features that are visually perceptible or "as seen" by users, rather than graphical attributes encoded in markup language that may or may not be visible in a rendered webpage. The detection engine 218 may determine graphical features corresponding to one or more images of a webpage. Example graphical features may include information associated with text (e.g., string or alphanumeric), formatting, images, video, other media, or some combination thereof, of a webpage displayed to a user. The text may indicate contact information or information describing goods or services. The images and videos may also depict text or visualizations of goods or services. In some embodiments, a graphical feature indicates a deviation between contents of two or more components (e.g., text or images) of a webpage, where the components may be overlapping. For example, the deviation is associated with different alphanumeric characters in strings displayed in two different images or portions of text. In some embodiments, the detection engine 218 uses optical character recognition to determine one or more strings, characters, or numbers represented in an image.

The web database 220 may store data associated with webpages including markup language of webpages (e.g., received from a web server 110), webpage target characteristics (e.g., determined by the markup language engine 214), renders of webpages (e.g., generated by the rendering engine 216), graphical features (e.g., determined by the detection engine 218), among other types of information. Components of the web detection system 100 may provide data for storage in the web database 220 or retrieve stored data from the web database 220.

Example Webpage Information

Figure 3:
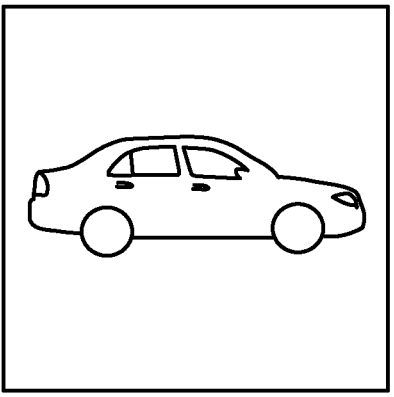
FIG. 3 illustrates a mockup of a webpage in accordance with one embodiment.
Figure 3:
Figure 3:
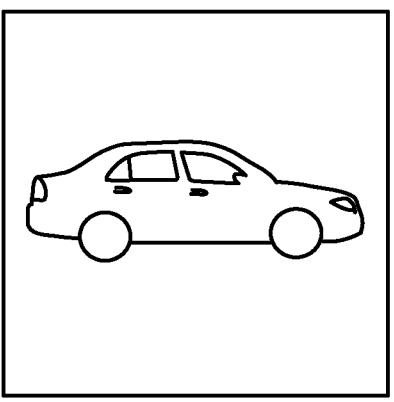
Figure 3:

FIG. 3 illustrates a mockup of a webpage in accordance with one embodiment. In the embodiment of FIG. 3, the webpage includes a heading having text "New and Used Cars" and may be associated with an entity providing cars for sale, e.g., a dealership. Section 300 of the webpage has text indicating contact information of the entity including a phone number "1-555-123-4567" and an email address "cars@domain.com." In other embodiments, the contact information may also include a physical address, mailing address, store locations, affiliations, among other relevant information of the entity. The webpage also includes images of available cars and other content describing the cars. Though not shown in detail in FIG. 3, the content may include model, make, trim, color, optional features, price, condition, or stock, among other information describing the cars. Though FIG. 3 shows cars for purposes of explanation, embodiments of the web detection system 100 described herein may be applicable for processing webpages including content associated with any type of content such as goods, services, or other promoted information.

Figure 4A:
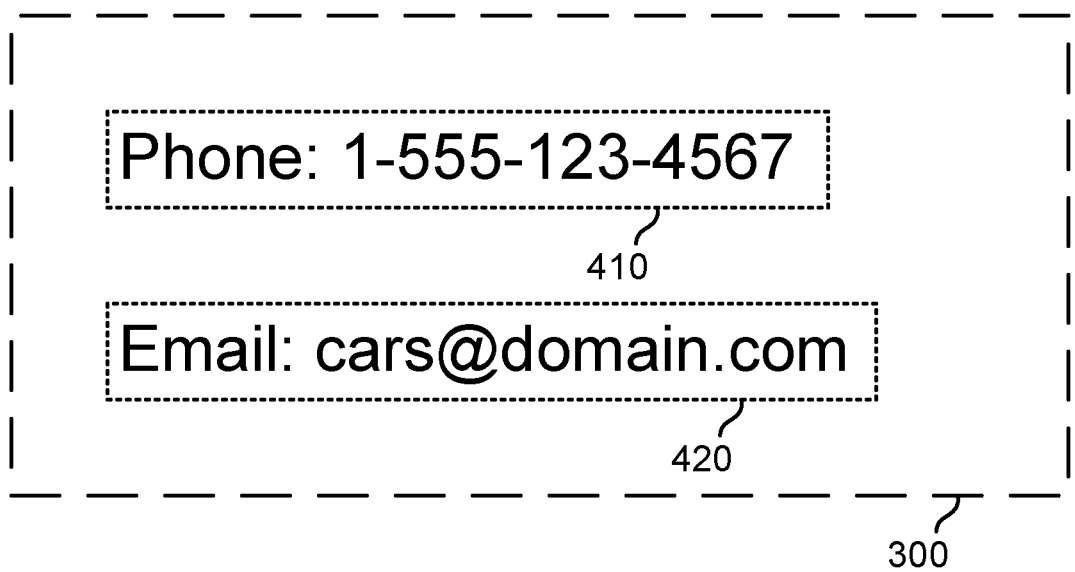
FIG. 4A illustrates a section of content from the webpage shown in FIG. 3 in accordance with one embodiment.
Figure 4B:
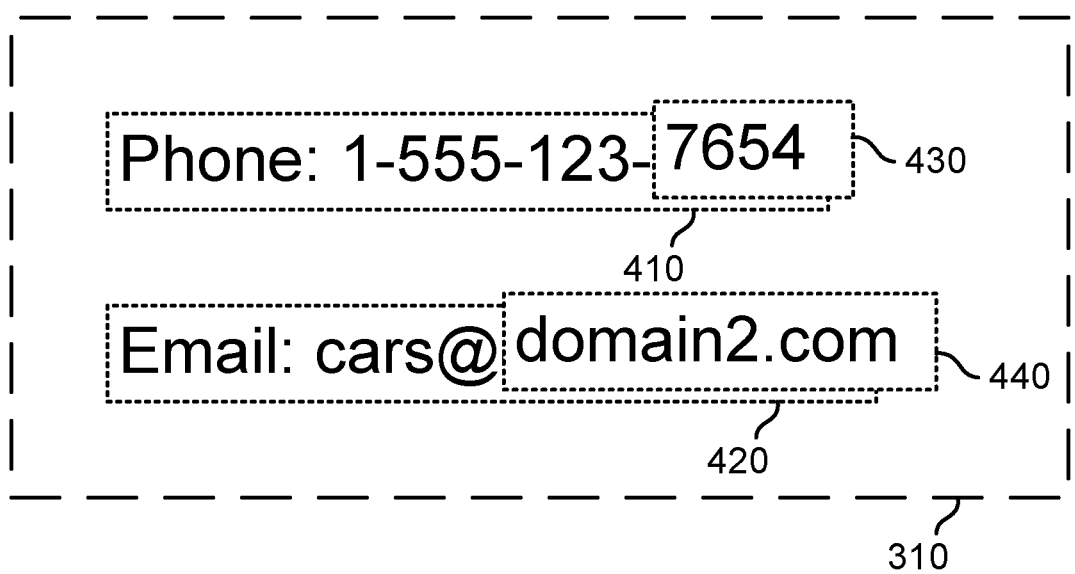
FIG. 4B illustrates content of a modified version of the webpage shown in FIG. 3 in accordance with one embodiment.

FIG. 4A illustrates the section 300 of content from the webpage shown in FIG. 3 in accordance with one embodiment. FIG. 4B illustrates content of a modified version of the webpage shown in FIG. 3 in accordance with one embodiment. As described above, the section 300 includes an image 410 of a phone number and an image 420 of an email address of the entity associated with the webpage. In an embodiment, the images 410 and 420 represent at least strings of the phone number and email address, respectively. In other embodiments, the phone number and email address may be represented by strings or a combination of one or more strings and images of strings.

In comparison to the section 300 shown in FIG. 4A, the modified version of the webpage shown in FIG. 4B includes a section 310 that is a modified version of the section 300 including the contract information. Particularly, the section 310 includes a different phone number "1-555-123-7654" and a different email address "cars@domain2.com." The section 310 has additional images of strings including the image 430 of the string "7654" and image 440 of the string "domain2.com." The rendering engine 216 determines that the image 430 overlaps a portion of the image 410 and that the image 440 overlaps a portion of the image 420. Specifically, the string "7654" overlaps the last four digits of the phone number: "4567." Additionally, the string "domain2.com" overlaps the domain of the email address: "domain.com." As a result, a user viewing the modified version of the webpage sees the phone number "1-555-123-7654" and email address "cars@domain2.com," which are different from the contact information in the original section 300 of webpage shown in FIGS. 3 and 4A.

The rendering engine 216 may generate an image of the webpage such that the image 430 overlaps the portion of the image 410 and that the image 440 overlaps the portion of the image 420. The detection engine 218 may process the generated image to determine graphical features including at least the two deviations described above, i.e., differences in the overlapping images of strings indicating the phone number and email address.

Example Process Flow

Figure 5:
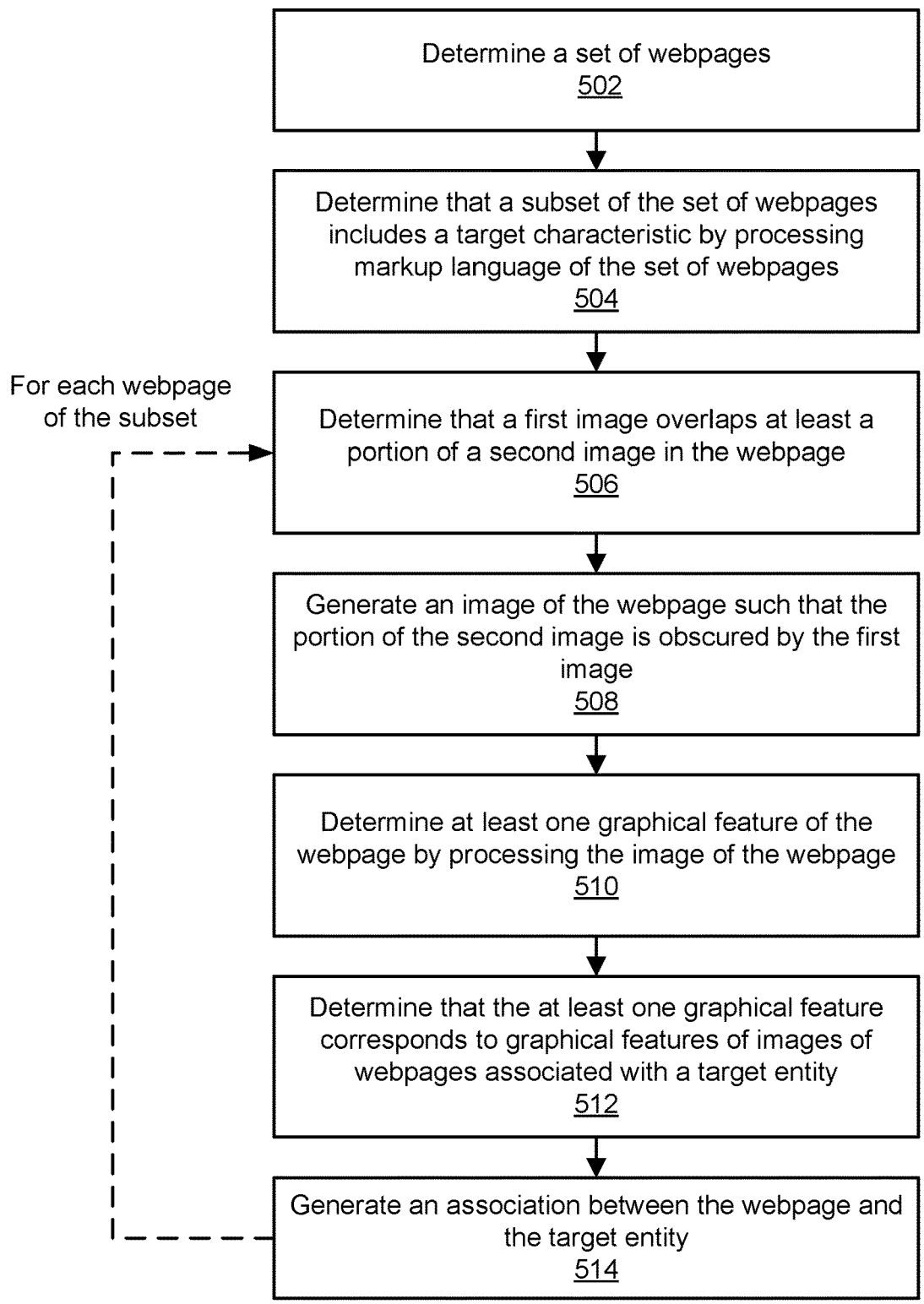
FIG. 5 is a flowchart illustrating a process for automated feature extraction of webpages in accordance with one embodiment.

FIG. 5 is a flowchart illustrating a process 500 for automated feature extraction of webpages in accordance with one embodiment. The process 500 may include different or additional steps than those described in conjunction with FIG. 5 in some embodiments or perform steps in different orders than the order described in conjunction with FIG. 5. Steps of the process 500 may be performed by components of the web detection system 100.

In an embodiment, the markup language engine 214 identifies 502 a set of webpages, e.g., including machine processable information. For example, the markup language engine 214 may receive webpage identifiers (e.g., using an application programming interface or search engine), and identify, determine, or retrieve the set of webpages using the webpage identifiers. In other embodiments, the markup language engine 214 may also receive the set of webpages from another source, not necessarily using webpage identifiers. The markup language engine 214 processes 504 markup language of the webpages to determine that a subset of the set of webpages includes a target characteristic. In some use cases, markup language engine 214 may perform a textual analysis of the markup language, where the target characteristic includes at least one keyword in the markup language. Responsive to determining that the subset of the set of webpages includes the target characteristic, for a webpage of the subset, the rendering engine 216 determines 506 that a first image overlaps at least a portion of a second image in the webpage based at least on markup language of the webpage. The rendering engine 216 generates 508 an image of the webpage such that the portion of the second image is obscured or altered by the first image. In other embodiments, the rendering engine 216 determines that a first object overlaps at least a portion of a second object, where the first and second objects are not necessarily images. For instance, the objects may include text, graphic, video, other types of objects, or any combination thereof.

The detection engine 218 determines 510 at least one graphical feature of the webpage by processing the image of the webpage. The at least one graphical feature corresponds to the portion of the second image. For example, the detection engine 218 uses optical character recognition to determine a first string represented by the portion of the second image. In other embodiments, the detection engine 218 determines at least one feature of the webpage, where the feature is not necessarily a graphical feature. For instance, the feature may be associated with textual information, metadata, or attributes of markup language of the webpage. Furthermore, the detection engine 218 uses optical character recognition to determine a second string represented by another portion of the first image that overlaps the portion of the second image. The detection engine 218 detects a deviation between the first string and the second string. Referring back to the example shown in FIGS. 4A-B, the first string "4567" in a portion of the image 410 includes a set of (e.g., one or more) alphanumeric characters. The second string "7654" is different from the first string by one or more alphanumeric characters. The graphical feature may indicate the deviation detected by the detection engine 218.

The detection engine 218 determines 512 that the at least one graphical feature corresponds to graphical features (or features) of images of a different set of webpages associated with a target entity. The images of the different set of webpages and associated graphical features may be retrieved from the web database 220 or another source (e.g., database 140) accessible by the web detection system 100. The target entity may be an organization or company providing goods or services, e.g., vehicles, medicine, consumable items, or apparel, accessories, electronics, among others.

Responsive to determining that the at least one graphical feature corresponds to the graphical features of images of the different set of webpages, the detection engine 218 generates 514 an association between the webpage and the target entity. For example, the graphical feature may be associated with contact information of the target entity. The graphical feature may also correspond to a logo of the target entity or an attribute (e.g., visual style, color palette, formatting of content, etc.) of webpages of the target entity or otherwise affiliated with the target entity. In some embodiments, the detection engine 218 determines that the webpage is associated with the target entity further based on metadata from the image of the webpage. The association may be stored in a database 140 or output to a client device 120. In some embodiments, the web detection system 100 stores generated associations in a same set of one or more database 140 that includes graphical features, images, webpages, or other information or media associated with target entities, e.g., used in step 512. In addition or alternatively to storage of associations, the web detection system 100 may provide an association to a client device 120 for presentation to a user. For instance, the client device 120 may display a notification or warning that a detected website is likely associated with a target entity, which may prompt remedial action by the user, the web detection system 100, or another system.

In some embodiments, the web detection system 100 may repeat steps 506 through 514 for each webpage of the subset. The web detection system 100 may store graphical features of the webpage in the web database 220. The web detection system 100 may detect graphical features indicating deviations (or not) in one or more of the webpages in the subset. The deviations may vary or have similarities between the webpages in the subset. Moreover, the web detection system 100 may determine that some webpages of the subset are associated with a first target entity and other webpages of the subset are associated with a second target entity. Generally, the web detection system 100 may process webpages to perform association ("matching") of graphical features with any number of target entities. The web detection system 100 may also flag certain graphical features or corresponding webpages that do not match with any currently known target entity. At a future time, the web detection system 100 may have an expanded database including images or other relevant information of webpages of a greater number of target entities. Thus, the web detection system 100 may perform steps of the process 500 to associate previously flagged webpages with target entities from the expanded database.

In some embodiments, a target entity is a supplier of particular goods or services, and the associated webpages may be associated with vendors that serve as an online storefront for those goods or services. Since the online storefronts may have a similar "look and feel" or visually perceptible elements, the web detection system 100 detects and uses graphical features to determine associations between webpages. A malicious entity or its vendors may obfuscate or fabricate information on webpages in an attempt to emulate the "look and feel" of a legitimate entity in some aspects, or may alter certain elements such as contact information to direct users to webpages of the malicious entity instead of the legitimate entity. By associating webpages with target entities, the web detection system 100 determines networks of related webpages. The web detection system 100 may provide information describing the networks of related webpages to other systems or authorities to facilitate remediation of potentially illegitimate activity. For instance, the web detection system 100 may generate a report describing webpages associated with the target entity and transmit the report to a client device 120.

Embodiments of the web detection system 100 provide technical improvements over conventional systems using optical character recognition. As previously described, it is computationally expensive to process large samples of websites due to large volumes of existing webpages of websites. By filtering webpages using a target characteristic, the web detection system 100 reduces the number of webpages that require further processing for detection of graphical features, which improves compute or search time. In an embodiment, the detection engine 218 may only need to perform optical character recognition to convert images of webpages in the filtered subset and not in the full set of webpages, resulting in more efficient processing. In some embodiments, the web detection system 100 determines that unusually complex or deeply layered webpage instructions or markup language associated with text, images, video, metadata, or other webpage objects that are perceptible by users when rendered in a user interface, are machine processable through automated processes for feature extraction.

Example Machine Architecture

Figure 6:
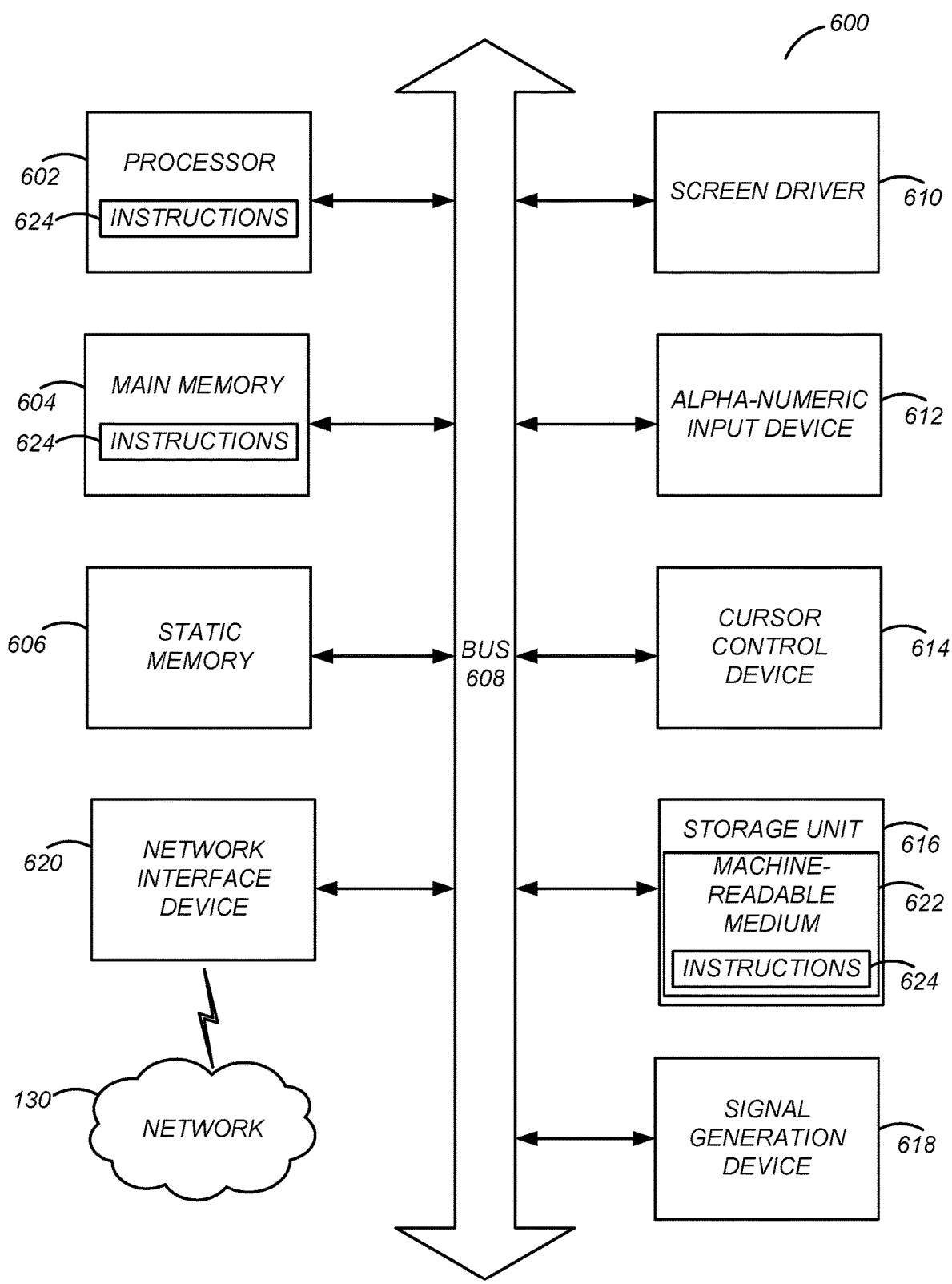
FIG. 6 is a block diagram illustrating components of an example machine able to read instructions from a machine-readable medium and execute them in one or more processors (or controllers) in accordance with one embodiment.

FIG. 6 is a block diagram illustrating components of an example machine able to read instructions from a machine-readable medium and execute them in one or more processors (or controllers) in accordance with one embodiment. The instructions (e.g., program code or software) may correspond to the process, for example, described in FIG. 5. The instructions also may correspond to the components/modules carrying out the functionality disclosed in FIGS. 1-4B.

Specifically, FIG. 6 shows a diagrammatic representation of an example form of a computer system 600. The computer system 600 can be used to execute instructions 624 (e.g., structured as program code or software) for causing the machine to perform any one or more of the methodologies (or processes) described herein, for example, in FIGS. 1-5. The machine may operate as a standalone device or a connected (e.g., networked) device that connects to other machines. In a networked deployment, the machine may operate in the capacity of a server machine or a client machine in a server-client network environment, or as a peer machine in a peer-to-peer (or distributed) network environment.

The machine may be a server computer, a client computer, a personal computer (PC), a tablet PC, a set-top box (STB), a smartphone, an internet of things (IoT) appliance, a network router, switch or bridge, or any machine capable of executing instructions 624 (sequential or otherwise) that specify actions to be taken by that machine. Further, while only a single machine is illustrated, the term "machine" shall also be taken to include any collection of machines that individually or jointly execute instructions 624 to perform any one or more of the methodologies discussed herein. In addition, it is noted that not all the components noted in FIG. 6 may be necessary for a machine to be configured to execute the systems and/or processes described within the disclosure.

The example computer system 600 includes one or more processing units (generally processor 602). The processor 602 is, for example, a central processing unit (CPU), a graphics processing unit (GPU), a digital signal processor (DSP), a controller, a state machine, one or more application specific integrated circuits (ASICs), one or more radio-frequency integrated circuits (RFICs), or any combination of these. The processor 602 may be similar to processor 200. The computer system 600 also includes a main memory 604. The computer system may include a storage unit 616. The processor 602, memory 604, and the storage unit 616 communicate via a bus 608.

In addition, the computer system 600 can include a static memory 606, a graphics display 610 (e.g., to drive a plasma display panel (PDP), a liquid crystal display (LCD), or a projector). The computer system 600 may also include alphanumeric input device 612 (e.g., a keyboard), a cursor control device 614 (e.g., a mouse, a trackball, a joystick, a motion sensor, or other pointing instrument), a signal generation device 618 (e.g., a speaker), and a network interface device 620, which also are configured to communicate via the bus 608.

The storage unit 616 includes a machine-readable medium 622 on which is stored instructions 624 (e.g., software) embodying any one or more of the methodologies or functions described herein. The instructions 624 may also reside, completely or at least partially, within the main memory 604 or within the processor 602 (e.g., within a processor's cache memory) during execution thereof by the computer system 600, the main memory 604 and the processor 602 also constituting machine-readable media. The instructions 624 may be transmitted or received over a network 626 via the network interface device 620.

While machine-readable medium 622 is shown in an example embodiment to be a single medium, the term "machine-readable medium" should be taken to include a single medium or multiple media (e.g., a centralized or distributed database, or associated caches and servers) able to store the instructions 624. The term "machine-readable medium" shall also be taken to include any medium that is capable of storing instructions 624 for execution by the machine and that cause the machine to perform any one or more of the methodologies disclosed herein. The term "machine-readable medium" includes, but not be limited to, data repositories in the form of solid-state memories, optical media, and magnetic media.

Additional Considerations

The disclosed configuration provides benefits and advantages that include, for example, processing webpages to determine graphical features and entities associated with one or more particular webpages. Additional benefits and advantages may include using optical character recognition to determine attributes or discrepancies (e.g., deviations) of text displayed on a rendered webpage for presentation to a user. Thus, in example use cases, these advantages may enable detection of groups of entities performing an online operation, for example, distribution of goods or services in a certain industry sector.

Throughout this specification, plural instances may implement components, operations, or structures described as a single instance. Although individual operations of one or more methods are illustrated and described as separate operations, one or more of the individual operations may be performed concurrently, and nothing requires that the operations be performed in the order illustrated. Structures and functionality presented as separate components in example configurations may be implemented as a combined structure or component. Similarly, structures and functionality presented as a single component may be implemented as separate components. These and other variations, modifications, additions, and improvements fall within the scope of the subject matter herein.

Certain embodiments are described herein as including logic or a number of components, modules, or mechanisms, for example, as illustrated in FIG. 2. Modules may constitute either software modules (e.g., code embodied on a machine-readable medium) or hardware modules. A hardware module is tangible unit capable of performing certain operations and may be configured or arranged in a certain manner. In example embodiments, one or more computer systems (e.g., a standalone, client or server computer system) or one or more hardware modules of a computer system (e.g., a processor or a group of processors) may be configured by software (e.g., an application or application portion) as a hardware module that operates to perform certain operations as described herein.

In various embodiments, a hardware module may be implemented mechanically or electronically. For example, a hardware module may comprise dedicated circuitry or logic that is permanently configured (e.g., as a special-purpose processor, such as a field programmable gate array (FPGA) or an application-specific integrated circuit (ASIC)) to perform certain operations. A hardware module may also comprise programmable logic or circuitry (e.g., as encompassed within a general-purpose processor or other programmable processor) that is temporarily configured by software to perform certain operations. It will be appreciated that the decision to implement a hardware module mechanically, in dedicated and permanently configured circuitry, or in temporarily configured circuitry (e.g., configured by software) may be driven by cost and time considerations.

The various operations of example methods described herein may be performed, at least partially, by one or more processors, e.g., processor 200 or processor 602, that are temporarily configured (e.g., by software) or permanently configured to perform the relevant operations. Whether temporarily or permanently configured, such processors may constitute processor-implemented modules that operate to perform one or more operations or functions. The modules referred to herein may, in some example embodiments, comprise processor-implemented modules.

The one or more processors may also operate to support performance of the relevant operations in a "cloud computing" environment or as a "software as a service" (SaaS). For example, at least some of the operations may be performed by a group of computers (as examples of machines including processors), these operations being accessible via a network (e.g., the Internet) and via one or more appropriate interfaces (e.g., application program interfaces (APIs)).

The performance of certain of the operations may be distributed among the one or more processors, not only residing within a single machine, but deployed across a number of machines. In some example embodiments, the one or more processors or processor-implemented modules may be located in a single geographic location (e.g., within a home environment, an office environment, or a server farm). In other example embodiments, the one or more processors or processor-implemented modules may be distributed across a number of geographic locations.

Some portions of this specification are presented in terms of algorithms or symbolic representations of operations on data stored as bits or binary digital signals within a machine memory (e.g., a computer memory). These algorithms or symbolic representations are examples of techniques used by those of ordinary skill in the data processing arts to convey the substance of their work to others skilled in the art. As used herein, an "algorithm" is a self-consistent sequence of operations or similar processing leading to a desired result. In this context, algorithms and operations involve physical manipulation of physical quantities. Typically, but not necessarily, such quantities may take the form of electrical, magnetic, or optical signals capable of being stored, accessed, transferred, combined, compared, or otherwise manipulated by a machine. It is convenient at times, principally for reasons of common usage, to refer to such signals using words such as "data," "content," "bits," "values," "elements," "symbols," "characters," "terms," "numbers," "numerals," or the like. These words, however, are merely convenient labels and are to be associated with appropriate physical quantities.

Unless specifically stated otherwise, discussions herein using words such as "processing," "computing," "calculating," "determining," "presenting," "displaying," or the like may refer to actions or processes of a machine (e.g., a computer) that manipulates or transforms data represented as physical (e.g., electronic, magnetic, or optical) quantities within one or more memories (e.g., volatile memory, non-volatile memory, or a combination thereof), registers, or other machine components that receive, store, transmit, or display information.

As used herein any reference to "one embodiment" or "an embodiment" means that a particular element, feature, structure, or characteristic described in connection with the embodiment is included in at least one embodiment. The appearances of the phrase "in one embodiment" in various places in the specification are not necessarily all referring to the same embodiment.

Some embodiments may be described using the expression "coupled" and "connected" along with their derivatives. For example, some embodiments may be described using the term "coupled" to indicate that two or more elements are in direct physical or electrical contact. The term "coupled," however, may also mean that two or more elements are not in direct contact with each other, but yet still co-operate or interact with each other. The embodiments are not limited in this context.

As used herein, the terms "comprises," "comprising," "includes," "including," "has," "having" or any other variation thereof, are intended to cover a non-exclusive inclusion. For example, a process, method, article, or apparatus that comprises a list of elements is not necessarily limited to only those elements but may include other elements not expressly listed or inherent to such process, method, article, or apparatus. Further, unless expressly stated to the contrary, "or" refers to an inclusive or and not to an exclusive or. For example, a condition A or B is satisfied by any one of the following: A is true (or present) and B is false (or not present), A is false (or not present) and B is true (or present), and both A and B are true (or present).

In addition, use of the "a" or "an" are employed to describe elements and components of the embodiments herein. This is done merely for convenience and to give a general sense of the invention. This description should be read to include one or at least one and the singular also includes the plural unless it is obvious that it is meant otherwise.

Upon reading this disclosure, those of skill in the art will appreciate still additional alternative structural and functional designs for a system and a process for detecting webpage information that may be executed through the disclosed principles herein. Thus, while particular embodiments and applications have been illustrated and described, it is to be understood that the disclosed embodiments are not limited to the precise construction and components disclosed herein. Various modifications, changes and variations, which will be apparent to those skilled in the art, may be made in the arrangement, operation and details of the method and apparatus disclosed herein without departing from the spirit and scope defined in the appended claims.

What is claimed is:

1. A method for automated feature extraction of webpages, the method comprising:
   determining, by processing markup language of a webpage, that a first object overlaps at least a portion of a second object in the webpage as rendered on a display, comprising:
   determining a first set of dimensions of the first object and a second set of dimensions of the second object based on the markup language of the webpage; and
   determining that the first object overlaps the second object based on the respective sets of dimensions;
   generating an image of the webpage such that the portion of the second object is obscured or altered by the first object;
   determining, by processing the image of the webpage, a feature of the webpage corresponding to the portion of the second object;
   identifying a match between the feature of the webpage and one or more features of a set of other webpages associated with a target entity; and
   generating, responsive to identifying the match, an association between the webpage and the target entity for storage in a database.

2. The method of claim 1, wherein
   the first set of dimensions are of a first image represented by the first object; and
   the second set of dimensions are of a second image represented by the second object.

3. The method of claim 2, wherein determining the feature comprises:
   determining a graphical feature of the second image overlapped by the first image, wherein the graphical feature is a logo or color associated with the target entity.

4. The method of claim 1, further comprising:
   determining a first string represented by the portion of the second object;
   determining a second string represented by another portion of the first object that overlaps the portion of the second object; and
   wherein determining the feature includes determining a deviation between the first string and the second string.

5. The method of claim 4, wherein the first string describes contact information of the target entity.

6. The method of claim 1, further comprising:
   determining a different feature of the webpage; and
   determining that the different feature does not match the one or more features of the set of other webpages associated with the target entity.

7. The method of claim 1, further comprising:
   providing a notification of the association between the webpage and the target entity to a client device for presentation to prompt remedial action.

8. The method of claim 1, wherein the target entity is a supplier of goods or services, and wherein the set of other webpages associated with the target entity serve as an online storefront for the goods or services.

9. The method of claim 1, wherein the image of the webpage is generated according to geographical location.

10. The method of claim 9, wherein the geographical location is a country or defined by a geo-fence.

11. A non-transitory computer-readable storage medium storing instructions for automated feature extraction of webpages, the instructions when executed by a processor causing the processor to:
    determine, by processing markup language of a webpage, that a first object overlaps at least a portion of a second object in the webpage as rendered on a display, comprising:
    determine a first set of dimensions of the first object and a second set of dimensions of the second object based on the markup language of the webpage; and
    determine that the first object overlaps the second object based on the respective sets of dimensions;
    generate an image of the webpage such that the portion of the second object is obscured or altered by the first object;
    determine, by processing the image of the webpage, a feature of the webpage corresponding to the portion of the second object;
    identify a match between the feature of the webpage and one or more features of a set of other webpages associated with a target entity; and
    generate, responsive to identifying the match, an association between the webpage and the target entity for storage in a database.

12. The non-transitory computer-readable storage medium of claim 11, wherein
    the first set of dimensions are of a first image represented by the first object; and
    the second set of dimensions are of a second image represented by the second object.

13. The non-transitory computer-readable storage medium of claim 12, wherein determine the feature comprises:
    determine a graphical feature of the second image overlapped by the first image, wherein the graphical feature is a logo or color associated with the target entity.

14. The non-transitory computer-readable storage medium of claim 11, the instructions when executed by the processor further causing the processor to:
    determine a first string represented by the portion of the second object;
    determine a second string represented by another portion of the first object that overlaps the portion of the second object; and
    wherein determine the feature includes determine a deviation between the first string and the second string.

15. The non-transitory computer-readable storage medium of claim 14, wherein the first string describes contact information of the target entity.

16. The non-transitory computer-readable storage medium of claim 11, the instructions when executed by the processor further causing the processor to:
    determine a different feature of the webpage; and
    determine that the different feature does not match the one or more features of the set of other webpages associated with the target entity.

17. The non-transitory computer-readable storage medium of claim 11, the instructions when executed by the processor further causing the processor to:
    provide a notification of the association between the webpage and the target entity to a client device for presentation to prompt remedial action.

18. The non-transitory computer-readable storage medium of claim 11, wherein the target entity is a supplier of goods or services, and wherein the set of other webpages associated with the target entity serve as an online storefront for the goods or services.

19. The non-transitory computer-readable storage medium of claim 11, wherein the image of the webpage is generated according to geographical location.

20. The non-transitory computer-readable storage medium of claim 19, wherein the geographical location is a country or defined by a geo-fence.

* * * * *